United States Patent [19]

Grossmann et al.

[11] 3,919,429
[45] Nov. 11, 1975

[54] DISPERSING AND WETTING AGENTS FOR USE IN ORGANIC BIOCIDES

[75] Inventors: Max Grossmann, Frankfurt (Main); Ruth Faber, Burgkirchen; Heinz Uhrig, Steinbach, Taunus, all of Germany

[73] Assignee: Hoechst Aktiengesellschaft, Frankfurt (Main), Germany

[22] Filed: Jan. 12, 1973

[21] Appl. No.: 323,307

[30] Foreign Application Priority Data
Jan. 18, 1972  Switzerland............ 720/72

[52] U.S. Cl. ............ 424/358; 260/457; 424/78; 424/213; 424/218; 424/278; 424/300; 424/303; 424/352; 424/354
[51] Int. Cl.² ............ A01N 9/00
[58] Field of Search............ 424/303, 358, 365; 260/457

[56] References Cited
UNITED STATES PATENTS
2,828,334   3/1958   DeGrotte............ 260/457
3,697,573   10/1972  Danzik et al............ 260/457

OTHER PUBLICATIONS
Chemical Abstracts, Vol. 75, (1971), p. 4620y.

*Primary Examiner*—V. D. Turner
*Attorney, Agent, or Firm*—Connolly and Hutz

[57] ABSTRACT

Sulfuric acid semi-esters of oxalkylated polynuclear alkylphenols of the formula

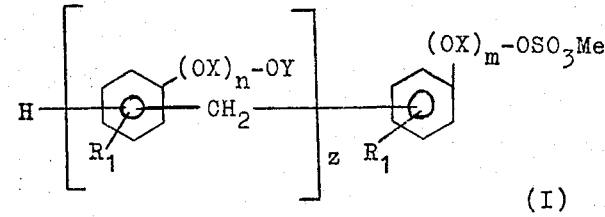

(I)

in which —(OX)— stands for an oxyalkylene radical, $R_1$ for an alkyl radical, X for hydrogen or $SO_3Me$, Me being hydrogen, ammonium, an alkali or alkaline earth metal, $n$ and $m$ for an integer of about 2 to 25 and $z$ for an integer of 1 to about 9, and their use as dispersing and wetting agents for water-insoluble organic biocidal compositions.

4 Claims, No Drawings

DISPERSING AND WETTING AGENTS FOR USE IN ORGANIC BIOCIDES The present invention relates to dispersing and wetting agents and their use in organic biocidal preparations.

In many cases, organic water-insoluble biocides are used in the form of so-called sprayable powders. These are pulverulent compositions of biocides to be sprayed as aqueous suspensions or liquors. In order to assure a satisfactory utility, these suspensions are to have a good distribution, a good capacity to be air-borne and a good wetting effect. In general, these sprayable liquors contain, in addition to the active ingredients (biocidal substance), carrier materials, for example aluminum or magnesium silicates or synthetic silicic acids and, where required, adhesives as well as wetting and dispersing agents. The active ingredient content of the sprayable powders may vary within wide limits; it mostly ranges from about 20 to 80 per cent by weight. The percentage of wetting and dispersing agents in the sprayable liquors generally ranges from about 0.5 to 8 per cent by weight.

As typical examples of organic biocidal substances, there may be mentioned chlorinated hydrocarbons, such as DDT, lindan, chlordan, aldrin, dieldrin, endrin and toxaphen as well as phosphoric acid esters, such as parathion, methyl-parathion, malathion, trithion and systox, and carbamates, such as carbaryl and similar compounds.

This invention provides sulfuric acid semi-esters of oxyalkylated polynuclear alkyl-phenols and their use as dispersing and wetting agents for water-insoluble organic biocidal substances. These sulfuric acid semi-esters of oxyalkylated polynuclear alkyl-phenols are compounds of the general formula I $$H-\left[\underset{R_1}{\underset{|}{\bigcirc}}(OX)_n-OY \atop CH_2-\right]_z \underset{R_1}{\underset{|}{\bigcirc}}(OX)_m-OSO_3Me \quad (I)$$

in which —(OX)— stands for an oxyalkylene radical, especially the oxyethylene and/or the oxypropylene radical, $R_1$ for a saturated linear or branched alkyl group having 1 to about 14, preferably 6 to 14, carbon atoms, Y for hydrogen or the radical —$SO_3Me$, in which Me represents hydrogen, ammonium, an alkali metal or an equivalent of an alkaline earth metal, and n and m each stands for an integer of from about 2 to 25 and z for an integer of 1 to about 9, preferably from 2 to 7.

For preparing the sulfuric acid semi-esters of oxyalkylated polynuclear alkyl-phenols of the formula I, monoalkyl-phenols of the formula II $$R_1-\underset{}{\bigcirc}-OH \quad (II)$$

in which $R_1$ is defined as above, are condensed with formaldehyde in a molar ratio of from about 2 : 1 to 10 : 9 according to known methods (cf. Hultzsch, "Chemie der Phenolharze", 1950, page 114) in the presence of acid catalysts to yield novolake resins, these resins are combined in an addition reaction with alkylene oxide in amounts of from 2 to 25 mols, calculated on each phenolic hydroxy group, according to known methods, preferably in the presence of alkaline catalysts to form novolake resin oxyalkylates, the free hydroxy groups of these oxyalkylates are then esterified, in total or in part, according to known methods to yield the sulfuric acid semi-esters.

This invention furthermore provides dispersible concentrates and sprayable powders on the basis of water-insoluble organic biocidal substances which have an effective content of sulfuric acid semi-esters of oxyalkylated polynuclear alkyl-phenols of the formula I as dispersing and wetting agents.

The novolake resins may be produced using, as monoalkylphenols of the formula II, for example cresols, ethyl-, isopropyl-, butyl-, hexyl-, octyl-, nonyl-, dodecyl- or tetradecyl-phenol or mixtures of these phenols, the alkyl groups of which may be linear or branched. Formaldehyde to be used for the reaction may be paraformaldehyde or it may be in the form of an aqueous solution. Inert solvents, for example benzene or toluene, may also be added. As acid catalysts, there may be used strong acids, for example hydrochloric acid, sulfuric acid, phosphoric acid or oxalic acid. Since it can easily be removed during the distillation of water, hydrochloric acid is preferably used. The acids are generally added in an amount of from about 0.1 to about 5 per cent by weight, calculated on the weight of alkyl-phenol. The condensation is carried out at temperatures of from about 0°to 150°C, preferably from 80°to 130°C, advantageously under an atmosphere of an inert gas, especially nitrogen. Water obtained after condensation is separated by distillation until the novolake resin contains less than 0.5 per cent by weight of water, this operation being performed, in its final phase, under reduced pressure, advantageously of less than 50 mm mercury.

The novolakes obtained are more or less brittle limpid resins, which have a yellowish brown color when obtained in large blocks. They are mixtures of polynuclear alkyl-phenols linked by means of methylene bridges. Their composition depends, above all, on the molar ratio of the two components alkyl-phenol and formaldehyde.

The oxyalkylation reaction of the novolake resins is carried out according to known methods with ethylene oxide of 1,2-propylene oxide or with ethylene oxide and 1,2-propylene oxide in the presence of alkaline catalysts at about 100°–210°C, preferably at 140°–170°C. If the addition reaction is carried out using ethylene oxide and 1,2-propylene oxide, the two alkylene oxides may be used either in a mixture with each other or in single or manifold alternation successively during the oxyalkylation reaction. The products obtained in the first case are hereinafter called "mixed" oxyalkylates and those obtained in the latter case are called "block" oxyalkylates.

As alkaline catalysts used for the oxyalkylation reaction, there are especially used alkali metal hydroxides, such as potassium hydroxide or preferably, sodium hydroxide, or alkali metal alkoxides, for example sodium methylate or sodium ethylate. The concentration of these alkaline catalysts preferably ranges from 0.05 to 1.0 per cent by weight, calculated on the novolake resin. The oxyalkylation reaction may be performed either without pressure or in autoclaves, into which the alkylene oxide may be fed in gaseous or liquid form. The amount of alkylene oxide to be fed is such that 2 to 25 mols of alkylene oxide radicals are introduced per phenolic hydroxy group of the novolake resin, preferably 3 to 15 mols of ethylene oxide per mol of starting alkylphenol.

The sulfation reaction of the novolake oxyalkylates obtained is carried out according to known methods, the sulfating agent being gaseous $SO_3$ diluted with an inert gas or an $SO_3$-addition product, for example $SO_3$-dioxan, or amidosulfonic acid or chlorosulfonic acid. Sulfation is brought about while carefully mixing, where required, with an addition of an inert diluent, for example methylene chloride. Depending on the sulfating agent chosen, the temperatures applied range from 0° to about 150°C. The amount of sulfating agent to be used may be such that all novolake oxyalkylate hydroxy terminal groups or only part thereof, but at least one hydroxy group, per molecule of the novolake oxyalkylate are reacted.

Whereas the sulfation reaction with amidosulfonic acid yields ammonium salts of the sulfuric acid semi-esters, the sulfation reaction with gaseous sulfur trioxide under an atmosphere of an inert gas, which is most interesting from the technical point of view, as well as the sulfation reaction with chlorosulfonic acid provide the sulfuric acid semi-esters in an acid form, from which the desired salts may easily be prepared by neutralization with corresponding inorganic or organic bases. For such neutralization, ammonia may as well be used as hydroxides, carbonates or oxides of alkali metals or alkaline earth metals, preferably alkali metal hydroxides which allow the very readily water-soluble alkali metal salts of the sulfuric acid semi-esters of the invention to be obtained.

For being used as dispersing and wetting agents, the sulfuric acid semi-ester salts obtained may be used, optionally without further purification, directly in the form of their solutions. The aqueous solutions of the sulfuric acid semi-ester salts may, however, if so desired, be also dehydrated according to known methods, for example by spray-drying. Spray-drying may also be performed in the presence of other substances, so-called carrier or support material, for example silicic acid. The salts of the sulfuric acid semi-esters of oxyalkylated novolake resins are glutinous to solid substances, they are excellent wetting and dispersing agents having a reduced foaming effect and are therefore especially suitable for the production of sprayable biocidal liquors.

The following Examples illustrate the manufacture of the sulfuric acid semi-esters of the formula I as well as the preparation of mononuclear comparative substances and a comparison test of these compounds as dispersing agents in sprayable liquors on the basis of water-insoluble organic biocides.

The terms hereinafter used for polynuclear novolakes, for example 3-nuclear nonylphenol novolake, mean that 3 mols of nonylphenol are reacted with 2 mols of formaldehyde.

Preparation of sulfuric acid semi-esters of oxyalkylated novolake resins a. Preparation of the novolake resins z + 1 mols of alkylphenol and z mols of formaldehyde are mixed at room temperature and, after addition of 0.55 percent by weight of concentrated hydrochloric acid (D 1.18), calculated on alkylphenol, the mixture is refluxed while stirring for 4 hours at 95°–106°C. Water is then distilled off, in the final phase under reduced pressure of about 20 to 2 mm mercury.

b. Oxyalkylation of the novolakes

1 Mol of the novolake resin is combined with 0.2 percent by weight of sodium hydroxide, calculated on the novolake resin, and the mixture is reacted, at 150°–160°C, with z . (n+m) mols of ethylene oxide. In the case of an oxyalkylation with ethylene oxide and 1,2-propylene oxide, the procedure may be as follows: In an appropriate vessel, ⅓ z . (n+m) mols of propylene oxide are mixed with ⅔ z . (n+m) mols of ethylene oxide and this mixture is reacted at 150°–160°C, or ⅓ z . (n+m) mols of propylene oxide are first reacted and then ⅔ z . (n+m) mols of ethylene oxide, or ⅓ z . (n+m) mols of ethylene oxide are first reacted, then ⅓ z . (n+m) mols of propylene oxide and finally ⅓ z . (n+m) mols of ethylene oxide.

The turbidity points (TP) of the oxyalkylates were determined in butyl-diglycol (BDG) (5 g of oxyalkylate dissolved in 25 ml of aqueous 25 percent butyldiglycol solution).

The following Examples serve to illustrate the invention, the percentages being by weight unless stated otherwise.

EXAMPLE 1 a. Preparation of a 2-nuclear novolake 1100 g of isononylphenol,-obtained by alkylation of phenol with isononylene(tripropylene)- , 79 g of paraformaldehyde (of 95 % strength), 11.8 g of concentrated hydrochloric acid are mixed at room temperature and the mixture is refluxed for 4 hours under an atmosphere of nitrogen. Subsequently, water is distilled off over 4 hours first under normal pressure while raising the internal temperature to 135°C, then pressure is carefully reduced and stirring is continued for 2 hours at about 20 mm mercury at 135°–140°C.

Yield: 1121 g of novolake.

b. Oxyethylation 828 g of this resin are oxyethylated, after addition of 4.5 g of freshly powderized caustic soda, in an autoclave while stirring and feeding in 1017 g of ethylene oxide at 150°–160°C and while maintaining a pressure of about 1 to 2 atmospheres. When the whole amount of ethylene oxide is introduced under pressure, stirring is continued for 1 hour at 150°–160°C. The oil obtained corresponds to the 2-nuclear nonlyphenol novolake having 12.6 mols of ethylene oxide.

($n_D^{25}$ = 1.4989), TP (in BDG): 81°to 82°C.

c. Sulfation reaction with amidosulfonic acid 867.8 g of oxyethylate are mixed with 175.5 g of amidosulfonic acid and 10.9 g of urea and the mixture is stirred for 7.5 hours at 122°–125°C under nitrogen, whereupon the cream-colored, very viscous reaction product (ammonium salt of bis-sulfuric acid-semi-ester of the 2-nuclear nonylphenol novolake oxyethylated with 12.6 mols of ethylene oxide) becomes soluble in water. For the conversion into the sodium salt, 433 g of ammonium salt are combined with 300 g of water and 470 ml of sodium hydroxide solution and the mixture is heated while feeding in nitrogen and stirring at 70°C until ammonia has been expelled. The sodium salt remaining in the aqueous residue (1071 g) may be used as an 41 percent solution or may be isolated by dehydration, advantageously after addition of silicic acid.

The sodium salt corresponds to the formula

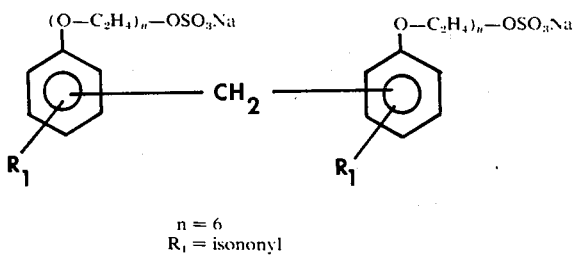

n = 6
R$_1$ = isononyl

EXAMPLE 2 a. Preparation of a 3-nuclear novolake 2200 g of nonylphenol, 211 g of paraformaldehyde (95 %) 24 g of concentrated hydrochloric acid are refluxed while stirring for 4 hours under a nitrogen atmosphere, water is then distilled off over 6 hours at normal pressure while the temperature is raised up to 135°C. The pressure is then carefully reduced until 16 mm mercury are reached, and stirring is continued for 2 hours at 135°-140°C and 16 mm mercury.

Yield: 2240 g (a limpid resin which is brittle at 15°-20°C and has a brown tinge when obtained in a thin layer).

b. Oxyethylation 950 g of the 3-nuclear nonylphenol novolake and 4 g of sodium hydroxide are oxyethylated with 1116 g of ethylene oxide as described in Example 1 b.

Yield is quantitative (addition product of 18.3 mols of ethylene oxide on 1 mol of 3-nuclear nonylphenol novolake)

$n_D^{25}$ = 1.5012, TP (in BDG) = 78°- 80°C.

c. Sulfation reaction with gaseous sulfur trioxide 740 g of the oxyethylate obtained according to Example 2 b and heated to 120°C are pumped from the top into a vertical cylinder having a length of 30 cm, a thermostat-controlled temperature of 40° to 45°C and an internal blade stirrer, and at the same time a mixture consisting of 4 to 5 percent of sulfur trioxide freshly prepared from sulfur dioxide and air and 95 to 96 percent of air is fed in at a ratio of 2 mols of sulfur trioxide per mol of the oxyethylate.

The low-viscosity bis-sulfuric acid semi-ester of the 3-nuclear nonylphenol novolake - 18.3 mol -ethylene oxide addition product thus obtained has an acid number of 63 to 67 (calculated: 66.8) and is soluble in water.

For the conversion into the sodium salt, 548.1 g of the bis-sulfuric acid semi-ester (acid number 63) are neutralized to pH 7.0 with 3000 g of water and 73 g of a 33 percent sodium hydroxide solution at room temperature.

2888 g of this solution are stirred with 221 g of silicic acid while adding 750 g of water at room temperature and this suspension is spray-dried. A powder is obtained which has good flow properties and a residual moisture content of 9 percent (H$_2$O according to Fischer) in addition to 32 percent of silicic acid.

EXAMPLE 3

740 g of the addition product prepared according to Example 2 a and b from 18.3 mols of ethylene oxide and 1 mol of 3-nuclear nonylphenol novolake are reacted as in Example 2 c in a ratio of 3 mols of SO$_3$ to 1 mol of the addition product. The tris-sulfuric acid semi-ester of the addition product of 3-nuclear nonylphenol novolake and 18.3 mols of ethylene oxide obtained (acid number: 98 -105, calculated 98.1) gives a clear solution in water.

723 g of this tris-sulfuric acid semi-ester are neutralized to pH 7.0 at room temperature with the addition of 2850 g of water by means of 159 g of a 33 percent sodium hydroxide solution.

295.1 g of silicic acid and 784 g of water are introduced into 2740 g of this aqueous solution and the mixture is spray-dried. The light beige powder obtained with good flow properties contains 3.8 percent of water and 33.6 percent in addition to the sodium salt of the tris-sulfuric acid semi-ester.

The sodium salt corresponds to the formula

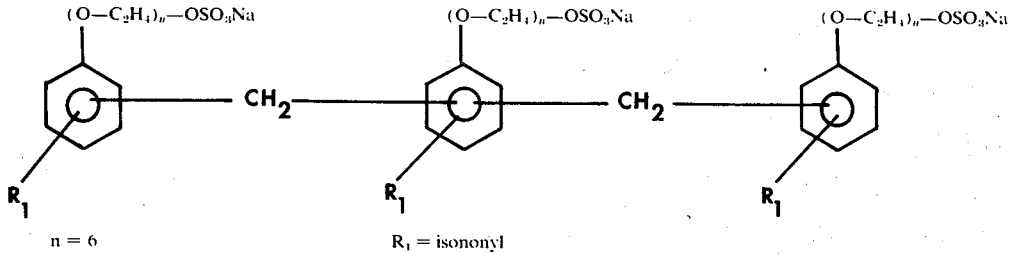

n = 6
R$_1$ = isononyl

EXAMPLE 4 a. Preparation of a 3-nuclear nonylphenol novolake as described in Example 2a.

b. Oxyalkylation 1090 g of a novolake resin prepared according to Example 2 a are reacted, as in Example 1 b, after addition of 4 g of sodium hydroxide, first with 554 g of 1,2-propylene oxide at 150°-160°C, then with 897 g of ethylene oxide at 150°-160°C. This corresponds to a block oxyalkylate of 1 mol of 3-nuclear nonyl-phenol novolake + 6 mols of propylene oxide + 12.8 mols of ethylene oxide.

Yield is quantitative; $n_D^{25}$ = 1.5017; TP (in BDG) 63°-64°C, insoluble in water.

c. Sulfation reaction with chlorosulfonic acid 319 g of this block oxyalkylate are diluted with 250 ml of methylene chloride and 70.8 g of chlorosulfonic acid are added dropwise at 15°-20°C, while passing a weak stream of dry nitrogen through the solution, thus removing the escaping gaseous hydrogen chloride via a reflux condenser. Toward the end of the reaction, the temperature is raised to 30°C and stirring is continued until no more gaseous hydrogen chloride escapes.

After methylene chloride has been distilled off under reduced pressure at 30°C, 375 g of an oil are obtained, which have an acid number of 91–94 (calc. 91.5) and a content of 0.04 percent of titrable chlorine (calc. 0%) as the tris-sulfuric acid semi-ester of the block condensate of 3-nuclear nonylphenol novolake + 6 mols of propylene oxide + 12.8 mols of ethylene oxide. For the neutralization, 370.2 g of the tris-sulfuric acid semi-ester are neutralized to pH 7.0 with 1200 g of water and 75 g of a 33 percent sodium hydroxide solution.

Yield: 1637 g of a light brown viscous limpid solution containing 23 percent of the sodium salt.

EXAMPLE 5 a. Preparation of novolake as described in Example 2 b. Oxyalkylation 1082 g of the novolake resin prepared according to Example 2 a are reacted, after addition of 4.0 g of sodium hydroxide, first with 418 g of ethylene oxide at 150°–160°C, then with 550 g of 1,2-propylene oxide at 150°–160°C and finally with 836 g of ethylene oxide at 150°–160°C as in Example 1 b.

Yield of a block condensation product of 3-nuclear nonylphenol novolake + 6 mols of ethylene oxide + 6 mols of propylene oxide + 12 mols of ethylene oxide is quantitative. $n_D^{25}$ = 1.4946; TP (in BDG) : 57°–58°C c. Sulfation reaction with chlorosulfonic acid After dilution with 250 ml of methylene chloride, 365.2 g of this block oxyalkylate are reacted with 70.6 g of chlorosulfonic acid, as described in Example 4 c, to yield the tris-sulfuric acid semi-ester of the block condensate of 3-nuclear nonylphenol novolake + 6 mols of ethylene oxide + 6 mols of propylene oxide + 12 mols of ethylene oxide.

Yield: 420 g of a brownish black oil (acid number 80–81, calc. 81.3). 207.8 g of this tris-sulfuric acid semi-ester are neutralized to pH 7.0 with 575 g of water and 36 g of a 33 percent sodium hydroxide solution.

Yield: 815 g of a brownish yellow limpid 26 percent solution of the sodium salt.

EXAMPLE 6 a. Preparation of the novolake as described in Example 2 a.

b. Oxyalkylation 694 g of ethylene oxide and 457 g of 1,2-propylene oxide are mixed in an autoclave at about −5°C. At 140°–165°C, a mixture of 900 g of 3-nuclear nonylphenol novolake and 4.0 g of sodium hydroxide is oxyalkylated with this alkylene oxide mixture as in Example 1 b.

Yield is quantitative: a mixed condensate of 3-nuclear nonylphenol novolake + 6 mols of propylene oxide + 12 mols of ethylene oxide ($h_D^{25}$ = 1.4957, TP (in BDG) : 54°–55°C).

c. Sulfation reaction with chlorosulfonic acid 400 g of the mixed oxyalkylate are reacted as in Example 4 c, after addition of 250 ml of methylene chloride, with 92 g of chlorosulfonic acid to yield the tris-sulfuric acid semi-ester (as in Example 4 (c)).

Yield: 473 g (acid number : 97, calc. 93.1) of a dark brown limpid oil which is still viscous at 25°C.

200 g of this tris-sulfuric acid semi-ester are reacted with 455 g of water and 41 g of a 33 percent sodium hydroxide solution as in Example 4 c to yield the sodium salt.

Yield: 693.5 g of a honey-colored limpid solution containing 29.9 % of the sodium salt, which corresponds to the formula

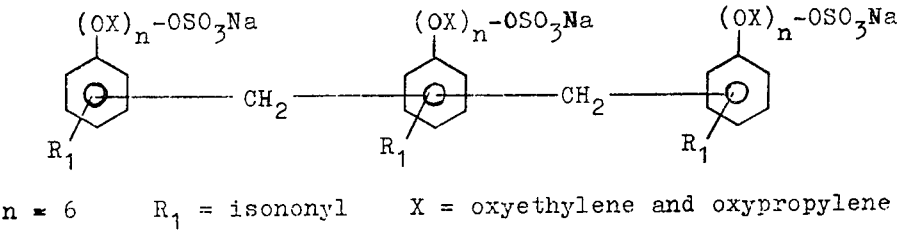

n = 6    $R_1$ = isononyl    X = oxyethylene and oxypropylene

EXAMPLE 7 a. Preparation of a 9-nuclear nonylphenol novolake 5940 g of nonylphenol, 758 g of paraformaldehyde and 50 g of concentrated hydrochloric acid are condensed and treated as in Example 2 a.

Yield: 6290 g of resin.

b. Oxyethylation 1000 g of this resins are oxyethylated, after addition of 4.0 g of sodium hydroxide, with 1145 g of ethylene oxide as in Example 1 b.

Yield of an addition product of 54 mols of ethylene oxide on 1 mol of 9-nuclear nonylphenol novolake is quantitative. ($n_D^{25}$ = 1.5051, TP (in BDG) : 81°–82°C).

c. Sulfation reaction 250 g of the oxyethylate obtained according to (b) are treated at 20°–25°C with 59.0 g of chlorosulfonic acid as in Example 4 c.

Yield: 291 g of 9-nuclear nonylphenol novolake + 54 mols of ethylene oxide-9-sulfuric acid semi-ester, dark-brown, low-viscosity oil, acid number: 100–103, calc. 97.1; Cl−: 0%.

290 g of the sulfuric acid semi-ester are neutralized by means of 1210 g of water and 63.6 g of a 33 percent sodium hydroxide solution to a pH-value of 7.0.

Yield: 1560 g of a dark brown limpid solution containing 19.3 percent of sodium salt.

EXAMPLE 8 a. Preparation of a 7-nuclear nonylphenol novolake 5940 g of nonylphenol, 731 g of paraformaldehyde and 35 g of concentrated hydrochloric acid are refluxed while stirring for 15 hours according to Example 2 a and then worked up as described.

Yield: 6170 g of a light yellow brittle resin.

b. Oxyethylation 1000 g of this product are reacted, after addition of 6.0 g of sodium hydroxide, with 747 g of ethylene oxide as in Example 1 b.

Yield is quantitative: An addition product of 27.4 mols of ethylene oxide on 1 mol of 7-nuclear nonylphenol novolake. ($n_D^{25}$ = 1.5184, TP (in BDG): 50°–52°C.

c. Sulfation reaction with chlorosulfonic acid

In the same manner as in Example 4 c, 164.9 g of the oxyethylate obtained according to 8 b and dissolved in 150 g of methylene chloride are sulfated with 47.7 g of chlorosulfonic acid at 20°–35°C.

After distillation of the methylene chloride, 177.0 g of the violetish brown-black paste are neutralized to pH 7.0 by means of 669 g of water and 60 g of a 33 percent sodium hydroxide solution.

Yield: 906 g of yellowish still viscous paste containing 20 percent of the sodium salt of the sulfuric acid semi-ester.

EXAMPLE 9 a. Preparation of novolake as described in Example 8 a b. Oxyethylation 1074 g of the novolake as obtained according to Example 8 a are reacted, after addition of 6.0 g of sodium hydroxide, with 2498 g of ethylene oxide as in Example 1 b.

Yield is quantitative: An addition product of 85 mols of ethylene oxide on 1 mol of 7-nuclear nonylphenol novolake. ($n_D^{25}$ = 1.4985, TP (in BDG): 100°C).

c. Sulfation reaction with chlorosulfonic acid 100 g of the oxyethylate obtained according to Example 9 b are diluted with 100 ml of methylene chloride and treated at 15°–40°C with 15.2 g of chlorosulfonic acid as in Example 4 c. After distillation of the methylene chloride, 115.5 g of a black-brown viscous oil (acid number 64.4 or 66.7) are obtained. Neutralization is made, after addition of 262 g of water, by means of 16.6 g of a 33 percent sodium hydroxide solution. 396.5 g of yellowish brown limpid solution of pH 7.4 are obtained, which contains about 29.9 percent of sodium salt of the sulfuric acid semi-ester.

EXAMPLE 10 a. Preparation of novolake as described in Example 7 a.

b. Oxyethylation 1000 g of the novolake as obtained in Example 7 a are combined with 5.0 g of sodium hydroxide solution and reacted with 4748 g of ethylene oxide as in Example 1 b.

Yield is quantitative: An addition product of 224 mols of ethylene oxide on 1 mol of 9-nuclear nonylphenol novolake. Resin, m.p. 38.5°–40°C, TP (in BDG) 100°C.

c. Sulfation reaction with chlorosulfonic acid

According to Example 4 c, 200 g of the oxyethylate obtained in Example 10 b are sulfated in 200 ml of methylene chloride with 17.6 g of chlorosulfonic acid at 15°– °C over 5.5 hours. After distillation of the methylene chloride, 213.9 g of sulfuric acid semi-ester are obtained as a dark brown substance which is no longer pourable. After addition of 251 g of water, 212.4 g of this product are neutralized by means of 183.5 ml of a 1N sodium hydroxide solution.

Yield: 648.0 g of a yellow limpid solution (pH 6.9) containing about 33.3 percent of sodium salt of the sulfuric acid semi-ester.

EXAMPLE 11 a. Preparation of a 5-nuclear n-hexylphenol novolake 293.2 g of a distilled mono-n-hexylphenol prepared from n-hexane-1-phenol while using boron fluoride as a catalyst (boiling point: 92°–95°C under a pressure of 0.3–0.4 mm mercury, $n_D^{25}$ = 1.5105), 41.5 g of paraformaldehyde and 1.5 g of concentrated hydrochloric acid are stirred for 1 hour at 40°C, the mixture is then heated for 1 hour at 100°C and then refluxed while stirring for 16 hours. The reaction product is worked up as in Example 2 a. 305.5 g of a yellow limpid resin which is still plastic at room temperature are obtained.

b. Oxyethylation 150 g of this 5-nuclear n-hexylphenol novolake are reacted without pressure, after addition of 0.5 g of sodium hydroxide, with 189.2 g of ethylene oxide in a glass vessel to yield the addition product of 27 mols of ethylene oxide on 1 mol of 5-nuclear n-hexylphenol novolake in the form of a light yellow limpid oil.

$n_D^{25}$ = 1.5092 TP (in BDG) = 68°–69°C.

c. Sulfation reaction with chlorosulfonic acid

As described in Example 4 c, 100 g of the oxyethylate obtained according to Example 11 b are dissolved in 50 ml of methylene chloride, 27.5 g of chlorosulfonic acid are added at 15°–20°C and the mixture is stirred for 4.5 hours at 25°–50°C. After distillation of the methylene chloride, a viscous still pourable oil (acid number: 108.5, calc. 110.9) is obtained which yields, after neutralization with 225 ml of 1N sodium hydroxide solution (pH 7.0), 375 of a limpid yellow solution having a content of about 33 percent of the sodium salt of the sulfuric acid semi-ester.

EXAMPLE 12 a. Preparation of a 3-nuclear dodecylphenol-novolake 524.0 g of dodecylphenol ($n_D^{25}$ = 1.5041), 42.1 g of paraformaldehyde and 3.0 g of concentrated hydrochloric acid are stirred for 1 hour at 25°C, the mixture is heated to 100°C for 3 hours and refluxed while stirring for 16 hours. The reaction product is worked up as in Example 2 a.

b. Oxyethylation

In a glass vessel, 156.0 g of this reddish brown resin are mixed with 0.5 g of sodium hydroxide and, at 160°–165°C, ethylene oxide is fed into this mixture without pressure until 158.5 g of ethylene are absorbed.

Yield: 315 g of an addition product of 18.7 mols of ethylene oxide on 1 mol of 3-nuclear dodecylphenol novolake ($n_D^{25}$ = 1.5040; TP (in BDG): 78°–79°C).

c. Sulfation reaction with chlorosulfonic acid

According to Example 4 c, 107 g of the oxyethylate of Example 12 b, 100 ml of methylene chloride are sulfated with 21.4 g of chlorosulfonic acid for 3.5 hours at 15°–40°C. After separation of the methylene chloride, 118.6 g of a residue (sulfuric acid semi-ester) are obtained. 118.0 g of this product are neutralized by means of 22.9 g of a 33 percent sodium hydroxide solution and 372 g of water.

Yield: 513 g of a yellow limpid solution containing 23.8 percent of the sodium salt of the sulfuric acid semi-ester.

EXAMPLE 13 a. Preparation of novolake as described in Example 7 a.

b. Oxyalkylation

After addition of 4.0 g of sodium hydroxide, 1000 g of the novolake prepared according to Example 7 a are first reacted with 1485 g of ethylene oxide and 990 g of this oxyethylate are then reacted with 306 g of propylene oxide as in Example 4 b to yield a block oxyalkylate of 1 mol of 9-nuclear nonylphenol novolake and 31.3 mols of ethylene oxide and 18.1 mols of propylene oxide.

($n_D^{25}$ = 1.5072; TP (in BDG) : 22°–28°C).

c. Sulfation reaction with amidosulfonic acid 225 of this oxyalkylate are combined with 46.0 g of amidosulfonic acid and 5 g of urea and the mixture is stirred for 6 hours at 125°–130°C (according to Example 1 c).

The ammonium salt obtained which is sparingly soluble in water is used as a dispersing agent for biocidal sprayable liquors without being converted into the sodium salt.

EXAMPLE 14 a. Preparation of a 3-nuclear p-cresol/nonylphenol-(1:1) mixed novolake 675 g of p-cresol, 1375 g of nonylphenol, 265 g of paraformaldehyde and 15.0 g of concentrated hydrochloric acid are reacted as in Example 12 a and the reaction product is worked up as in Example 2 a.

Yield: 2140 g of a very brittle non glutinous resin.

b. Oxyethylation 1032 g of this 3-nuclear p-cresol/nonylphenol (1:1) mixed novolake are reacted, after addition of 2.0 g of sodium hydroxide, with 1405 g of ethylene oxide as in Example 1 b to yield the addition product of 16 mols of ethylene oxide on 1 mol of 3-nuclear p-cresol/nonylphenol (1:1) mixed novolake.

($n_D^{25}$ = 1.5141; TP (in BDG) : 74°–74.5°C).

c. Sulfation reaction with chlorosulfonic acid 100 g of this oxyethylate dissolved in 100 ml of methylene chloride are sulfated as in Example 4 c with 28.6 g of chlorosulfonic acid for 2.5 hours at 20°–40°C. After separation of methylene chloride, the sulfuric acid semi-ester is obtained as a dark hardly viscous paste (acid number: 110.9, calc. 115.1). After addition of 236 g of water, the mixture is neutralized by means of 28.5 g of a 33 percent sodium hydroxide solution.

Yield: 386 g of a yellow-brown solution containing about 31 percent of the sodium salt of the sulfuric acid semi-ester.

Preparation of the comparative substances

Comparative product 15

1 Mol of di-nonylphenol is oxyethylated with 11 mols of ethylene oxide as described in Example 1 b and sulfated as in Example 1 c. The product is then converted into the sodium salt of the sulfuric acid semi-ester.

Comparative product 16

1 Mol of tributylphenol is oxyethylated with 7 mols of ethylene oxide as described in Example 1 b. The oxyalkylate obtained is sulfated as in Example 1 c and converted into the sodium salt.

Comparative product 17

As the comparative product 17, n-dodecyl-sulfate sodium is used.

Technological tests were made to compare the dispersing and wetting properties as well as the foaming behavior of the sulfuric acid semi-esters of the invention (Table I, II and III) with those of the comparative substances (Table IV) when used as wetting and dispersing agents in sprayable biocidal liquors.

In these tests, the capacity of being air-borne was determined according to the cylinder method of Fischer (cf. Handbuch der landwirtschaftlichen Versuchs- und Untersuchungsmethodik (Methodenbuch) volume VII "Die Untersuchungen von Pflanzenschutzmitteln" by W. Fischer (1941), page 53 and page 12.)

The wetting effect was determined as follows:

A beaker glass having a capacity of 500 ml (and a diameter of 8 cm) is filled with tap water of 20°C and 12° of German hardness. 1 Gram of the sprayable powder to be tested is strewn on the surface of the water. The time required for wetting the powder is measured and indicated as the wetting time in seconds.

The foaming behavior was tested according to J. Ross and G. D. Miles (cf. Oil and Soap 18 (1041), page 99), using a concentration of 4 grams of the sprayable powder to be tested per liter of water for a quantity of 500 ml, in each case. The foaming height was measured in centimeters at the beginning of the test and after a period of 5 minutes.

The comparative tests as to the wetting and dispersing agents are made on the following sprayable powder formulations:

A.

50 % by weight of lindan
37 % by weight of siliceous chalk
10 % by weight of silicic acid and
3 % by weight of wetting and dispersing agent.

B.

50 % by weight of technical-grade DDT
37 % by weight of siliceous chalk
10 % by weight of silicic acid and
3 % by weight of wetting and dispersing agent.

C.

30 % by weight of endosulfan
64 % by weight of siliceous chalk
3 % by weight of silicic acid and
3 % by weight of wetting and dispersing agent.

D.

50 % by weight of o-phaltan
37 % by weight of siliceous chalk
10 % by weight of silicic acid and
3 % by weight of wetting and dispersing agent.

E.

25 % by weight of simazin
72 % by weight of siliceous chalk + silicic acid and
3 % by weight of wetting and dispersing agent.

The results of these tests are compiled in Tables I, II and III. A comparison of the results in Tables I to III with those in Table IV, above all, demonstrates the excellent dispersing properties of all the active ingredient combinations chosen as well as the weak foaming effect of the wetting and dispersing agents of the invention as compared to the comparative substances indicated in Table IV.

TABLE I

Dispersing effect of sulfuric acid semi-esters of oxyalkylated novolakes in sprayable powder formulations.
Wetting and dispersing agents according to Examples 1 to 14.

| Example | Capacity of being air-borne in % sprayable powder formulation A | B | C | D | E |
|---|---|---|---|---|---|
| 1 | 87 | 73 | 83 | — | — |
| 2 | 87 | 65 | 81 | — | — |
| 3 | 90 | 70 | 79 | — | — |
| 4 | 98 | 86 | 87 | 86 | 87 |
| 5 | 95 | 82 | 76 | 84 | 85 |
| 6 | 96 | 84 | 74 | 84 | 85 |
| 7 | 95 | 89 | 82 | 87 | 87 |
| 8 | 74 | 25 | 28 | 86 | 78 |
| 9 | 91 | 90 | 82 | 78 | 80 |
| 10 | 91 | 89 | 87 | — | — |
| 11 | 89 | 49 | 49 | — | — |
| 12 | 96 | 58 | 69 | — | — |
| 13 | 70 | 69 | 57 | 42 | 78 |
| 14 | 93 | 92 | 84 | 84 | 84 |

TABLE II

Wetting effect of sulfuric acid semi-esters of oxyalkylated novolakes in sprayable powder formulations Wetting and dispersing agents according to Examples 1 to 14.

| Example | Wetting time in seconds sprayable powder formulations A | B | C | D | E |
|---|---|---|---|---|---|
| 1 | 20 | 15 | 10 | — | — |
| 2 | 20 | 10 | 8 | — | — |
| 3 | 18 | 13 | 10 | — | — |
| 4 | 20 | 15 | 15 | 10 | 7 |
| 5 | 12 | 17 | 8 | 10 | 8 |
| 6 | 13 | 17 | 8 | 8 | 6 |
| 7 | 12 | 12 | 10 | 8 | 8 |
| 8 | 25 | 25 | 10 | 15 | 10 |
| 9 | 20 | 25 | 15 | 7 | 5 |
| 10 | 15 | 15 | 15 | 8 | — |
| 11 | 15 | 15 | 10 | — | — |
| 12 | 20 | 20 | 15 | — | — |
| 13 | 105 | 65 | 35 | — | — |
| 14 | 15 | 20 | 15 | 7 | 7 |

TABLE III

Foaming behavior of sulfuric acid semi-esters of oxyethylated/oxypropylated novolakes Foam (Ross and Miles) (immediately/after 5 minutes) wetting and dispersing agents according to Examples 1 to 14

| Example | sprayable powder formulations A | B | C | D | E |
|---|---|---|---|---|---|
| 1 | 8.0/8.0 | 2.5/1.5 | 5.5/4.5 | — | — |
| 2 | 1.0/0.5 | 0.5/0.0 | 1.0/0.5 | — | — |
| 3 | 2.5/2.0 | 1.5/0.5 | 2.5/1.5 | — | — |
| 4 | 3.5/3.0 | 2.0/0.5 | 2.5/1.0 | 5.0/5.0 | 3.5/2.5 |
| 5 | 4.0/3.0 | 1.5/0.5 | 2.0/1.0 | 6.5/6.0 | 4.0/3.0 |
| 6 | 2.5/2.0 | 2.0/0.5 | 2.5/1.5 | 8.0/7.0 | 5.0/4.5 |
| 7 | 2.5/1.0 | 1.0/0.0 | 2.0/0.0 | 2.5/1.5 | 2.5/2.0 |
| 8 | 2.0/1.5 | 1.5/1.0 | 2.5/0.5 | 4.5/2.0 | 2.5/1.5 |
| 9 | 4.0/3.0 | 2.0/1.0 | 2.0/0.5 | 3.5/3.0 | 3.5/3.0 |
| 10 | 4.0/3.0 | 2.5/1.0 | 2.0/0.5 | — | — |
| 11 | 6.5/5.5 | 3.5/2.0 | 4.0/3.0 | — | — |
| 12 | 3.0/1.5 | 2.0/1.0 | 4.0/3.0 | — | — |
| 13 | 2.0/2.0 | 2.0/1.5 | 2.0/1.5 | 1.0/1.0 | 1.0/0.5 |
| 14 | 6.5/5.0 | 5.0/4.0 | 3.5/3.0 | 10.0/10.0 | 8.0/7.0 |

TABLE IV

Wetting and dispersing properties of sulfuric acid semi-esters of oxyethylated 1-nuclear alkylphenols in sprayable powder formulations

| Sprayable powder formulation | capacity of being air-borne in % | | | wetting effect in seconds | | | foam (R + M) immediately/after 5 min. | | |
|---|---|---|---|---|---|---|---|---|---|
| wetting and dispersing agents : Comparative products 15 to 17 | | | | | | | | | |
| product | 15 | 16 | 17 | 15 | 16 | 17 | 15 | 16 | 17 |
| A | 87 | 83 | 19 | 20 | 12 | 10 | 3.0/2.5 | 12.0/12.0 | 13.0/12.0 |
| B | 69 | 84 | 22 | 15 | 12 | 17 | 2.5/1.5 | 8.5/6.5 | 11.0/4.0 |
| C | 47 | 71 | 15 | 10 | 14 | 8 | 3.0/2.5 | 14.5/13.5 | 18.0/17.0 |

We claim:

1. A dispersible concentrate of a water-insoluble organic biocidal substance, which comprises, as dispersing and wetting agent, a sulfuric acid semi-ester of an oxyalkylated polynuclear alkylphenol of the formula I 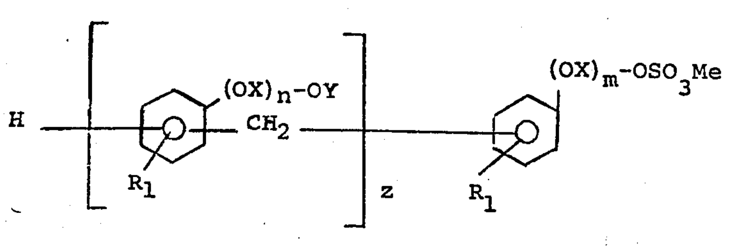 (I)

in which —(OX)— stands for an oxyalkylene radical having 2 or 3 carbon atoms, $R_1$ is a saturated linear or branched alkyl group having 1 to about 14 carbon atoms, Y is a hydrogen atom or a radical —$SO_3$Me, Me

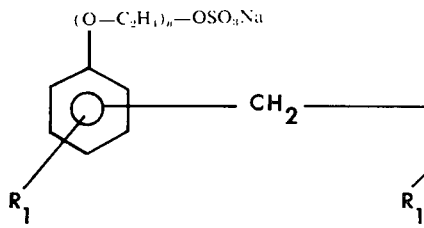

representing hydrogen, ammonium or an alkali metal, and $n$ and $m$ stand for an integer of about 2 to 25 and $z$ for an integer of 1 to about 9, said organic biocidal substance being a chlorinated hydrocarbon, phosphoric acid ester or carbamate, in an amount of about 20–80 percent by weight, the amount of said dispensing and wetting agent being about 0.5–8 percent by weight.

2. The dispersible concentrate as claimed in claim 1, wherein said dispersing and wetting agent is a compound of the formula

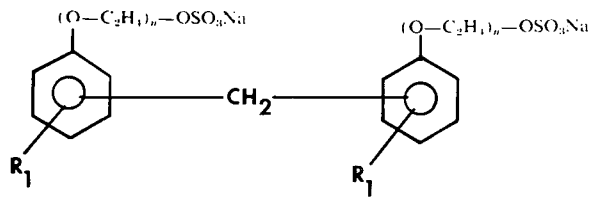

in which $n$ is 6 and $R_1$ is isononyl.

3. The dispersible concentrate as claimed in claim 1, wherein said dispersing and wetting agent is a compound of the formula

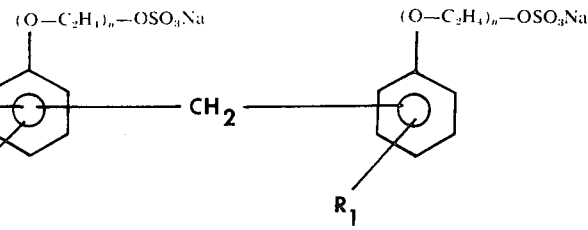

in which $n$ is 6 and $R_1$ is isononyl.

4. The dispersible concentrate as claimed in claim 1, wherein said dispersing and wetting agent is a compound of the formula

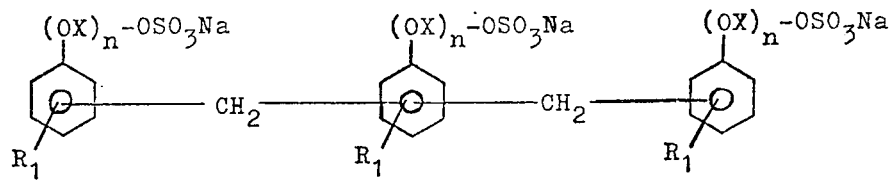

in which $n$ is 6, $R^1$ is isononyl and X are oxyethylene and oxypropylene radicals in a molar ratio of oxyethylene to oxypropylene of 2:1.

* * * * *